US012361929B2

(12) United States Patent
Back et al.

(10) Patent No.: US 12,361,929 B2
(45) Date of Patent: Jul. 15, 2025

(54) ELECTRONIC APPARATUS AND METHOD FOR CONTROLLING THEREOF

(71) Applicant: Samsung Electronics Co., Ltd., Suwon-si (KR)

(72) Inventors: Seohyun Back, Suwon-si (KR); Taeho Kil, Suwon-si (KR); Kyungsu Kim, Suwon-si (KR); Daehun Kim, Suwon-si (KR); Sungjin Kim, Suwon-si (KR); Younguk Kim, Suwon-si (KR); Hyunhan Kim, Suwon-si (KR); Gyubin Son, Suwon-si (KR); Hojin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 17/670,992

(22) Filed: Feb. 14, 2022

(65) Prior Publication Data
US 2022/0223141 A1    Jul. 14, 2022

Related U.S. Application Data

(63) Continuation of application No. PCT/KR2021/019481, filed on Dec. 21, 2021.

(30) Foreign Application Priority Data

Jan. 14, 2021    (KR) .......................... 10-2021-0005351

(51) Int. Cl.
*G10L 15/16*    (2006.01)
*G10L 15/22*    (2006.01)

(52) U.S. Cl.
CPC .............. *G10L 15/16* (2013.01); *G10L 15/22* (2013.01); *G10L 2015/221* (2013.01); *G10L 2015/223* (2013.01)

(58) Field of Classification Search
CPC ... G10L 15/16; G10L 15/22; G10L 2015/221; G10L 2015/223; G06Q 10/10; (Continued)

(56) References Cited

U.S. PATENT DOCUMENTS 6,526,395 B1    2/2003   Morris
7,137,126 B1   11/2006   Coffman et al.
(Continued)

FOREIGN PATENT DOCUMENTS

JP    2004-272693 A    9/2004
JP    2006-201870 A    8/2006
(Continued)

OTHER PUBLICATIONS

Hadj, R. B., Hamon, C., Chollet, S., Vega, G., & Lalanda, P. (Mar. 2017). Context-based conflict management in pervasive platforms. In 2017 IEEE International Conference on Pervasive Computing and Communications Workshops (PerCom Workshops) (pp. 250-255). IEEE. (Year: 2017).*

(Continued)

*Primary Examiner* — Bhavesh M Mehta
*Assistant Examiner* — Philip H Lam
(74) *Attorney, Agent, or Firm* — Jefferson IP Law, LLP

(57) ABSTRACT

An electronic apparatus is provided. The electronic apparatus includes a communication interface, a memory, and a processor, wherein the processor is configured to acquire a user command from the user and control the communication interface to transmit the user command to a plurality of external devices, receive information on a first question generated based on the user command and information on first response to the generated first question acquired from users of each of the plurality of external devices, identify whether there a conflict between each first response occurs, acquire information on a subject to be re-questioned, control (Continued)

the communication interface to transmit information on the conflict to at least one external device identified, receive information on a second response to a second question generated, and acquire a final response based on the information on the first response and the information on the second response and output the final response.

14 Claims, 17 Drawing Sheets

(58) Field of Classification Search
CPC ............ G06Q 30/016; G06Q 30/0282; G06Q 30/0601; G06F 40/216; G06F 40/284; G06F 40/35; G06F 16/63
See application file for complete search history.

(56) References Cited

U.S. PATENT DOCUMENTS

| | | | |
|---|---|---|---|
| 8,005,673 B2 | 8/2011 | Nagashima | |
| 8,959,043 B2 | 2/2015 | Ferrucci et al. | |
| 10,467,270 B2 | 11/2019 | Fan et al. | |
| 10,607,605 B2 | 3/2020 | Jeon et al. | |
| 10,664,744 B2 | 5/2020 | Weston et al. | |
| 10,708,424 B1 | 7/2020 | Maestas | |
| 11,010,555 B2* | 5/2021 | Terry | G06N 5/046 |
| 2006/0041450 A1* | 2/2006 | Dugan | G06Q 10/10 |
| | | | 705/2 |
| 2009/0235356 A1* | 9/2009 | Jensen | G06N 5/043 |
| | | | 715/810 |
| 2014/0195230 A1 | 7/2014 | Han et al. | |
| 2016/0179462 A1* | 6/2016 | Bjorkengren | G10L 15/22 |
| | | | 704/275 |
| 2016/0231915 A1* | 8/2016 | Nhan | G06F 40/186 |
| 2016/0315996 A1* | 10/2016 | Ha | H04L 12/2821 |
| 2018/0137856 A1* | 5/2018 | Gilbert | G06F 3/167 |
| 2018/0349207 A1* | 12/2018 | Erickson | H04L 9/3239 |
| 2018/0366116 A1* | 12/2018 | Nicholson | G10L 15/22 |
| 2019/0019133 A1* | 1/2019 | Allen | G06Q 10/1053 |
| 2019/0026838 A1* | 1/2019 | Tan | G06Q 10/10 |
| 2019/0103101 A1 | 4/2019 | Danila et al. | |
| 2019/0115104 A1 | 4/2019 | Uske et al. | |
| 2019/0141405 A1 | 5/2019 | Wang | |
| 2020/0027456 A1 | 1/2020 | Kim et al. | |
| 2020/0125967 A1 | 4/2020 | Seo et al. | |
| 2020/0265327 A1* | 8/2020 | Kwiatkowski | G06F 40/30 |
| 2020/0334772 A1* | 10/2020 | Gorodeisky | G06Q 50/182 |
| 2020/0380962 A1* | 12/2020 | Pavlou | G10L 15/22 |
| 2021/0022218 A1* | 1/2021 | Maeng | H04L 12/2825 |
| 2021/0117423 A1* | 4/2021 | Imazu | G06F 16/90332 |

FOREIGN PATENT DOCUMENTS

| | | |
|---|---|---|
| JP | 2020-060809 A | 4/2020 |
| KR | 10-2018-0014137 A | 2/2018 |
| KR | 10-1872863 B1 | 7/2018 |
| KR | 10-2020-0013152 A | 2/2020 |

OTHER PUBLICATIONS

Back et al., NeurQuRI: Neural Question Requirement Inspector for Answerability Prediction in Machine Reading Comprehension, ICLR 2020 (https://openreview.net/forum?id=ryxgsCVYPr).

Zhang et al., Complex Question Decomposition for Semantic Parsing, 2019 [https://www.aclweb.org/anthology/P19-1440.pdf].

International Search Report dated Apr. 1, 2022, issued in International Patent Application No. PCT/KR2021/019481.

\* cited by examiner

| SLAVE NODE | KEYWORD |
|---|---|
| SEARCH SERVER | SEARCH |
|  | ⋮ |
| EXTERNAL DEVICE | FAMILY |
|  | ⋮ |
| ORDER SERVER | ORDER |
|  | ⋮ |

ELECTRONIC APPARATUS AND METHOD FOR CONTROLLING THEREOF

CROSS-REFERENCE TO RELATED APPLICATION(S)

This application is a continuation application, claiming priority under § 365(c), of an International application No. PCT/KR2021/019481, filed on Dec. 21, 2021, which is based on and claims the benefit of a Korean patent application number 10-2021-0005351, filed on Jan. 14, 2021, in the Korean Intellectual Property Office, the disclosure of which is incorporated by reference herein in its entirety.

BACKGROUND

1. Field

The disclosure relates to an electronic apparatus and a control method thereof. More particularly, the disclosure relates to an electronic apparatus that identifies a conflict between information collected from external devices, and outputs a response based on whether there is a conflict, and a control method thereof.

2. Description of the Related Art

With the development of electronic technology, services using a virtual assistant application (e.g., Bixby) are being used in recent years. A representative example is a conversation service that provides a response to a user's question or request.

The above information is presented as background information only to assist with an understanding of the disclosure. No determination has been made, and no assertion is made, as to whether any of the above might be applicable as prior art with regard to the disclosure.

However, the existing virtual assistant can provide a response only to a relatively simple question (e.g., "Tell me about the weather tomorrow"), such that there is a limited utilization.

Meanwhile, in recent years, consumers' needs for a conversation service that can handle not only simple questions but also complex questions (e.g., "Can my family get together today?") are increasing. A complex question means a question that needs to be split into multiple queries to generate a response.

Accordingly, there is a need for a technology that can provide answers to complex questions.

SUMMARY

Aspects of the disclosure are to address at least the above-mentioned problems and/or disadvantages and to provide at least the advantages described below. Accordingly, an aspect of the disclosure is to provide an electronic apparatus that interacts with a plurality of agents to identify whether each agent conflicts with each other, and outputs a response based on the identified result.

Technical problems of the disclosure are not limited to the technical problem described above, and other technical problems not described will be clearly understood by those skilled in the art from the following description.

In accordance with an aspect of the disclosure, a method of controlling an electronic apparatus is provided. The method includes acquiring a user command from a user and transmitting the user command to a plurality of external devices, receiving, from each external device of the plurality of external devices, information on a first question generated by the external device based on the user command and information on first response acquired by the external device in response to the generated first question, analyzing each received information on the first response, identifying, based on the analyzing, whether a conflict between each first response occurs, based on identification that the conflict occurs, acquiring information on a subject to be re-questioned based on the received information on the generated first question and the received information on the first response, transmitting information on the conflict to at least one external device of the plurality of external devices, the at least one external device identified based on the information on the subject to be re-questioned, receiving, from the identified at least one external device, information on a second response acquired by the identified at least one external device in response to a second question generated based on the information on the conflict, determining a final response based on the information on the first response and the information on the second response, and outputting the final response.

The identifying of whether the conflict between each first response occurs may include inputting a predetermined token and the information on the first response into a first neural network model and acquiring an embedding vector corresponding to the predetermined token, and based on the embedding vector is a predetermined value, identifying the conflict between each first response occurs.

The first neural network model may be learned to identify whether a plurality of input text conflict with each other.

The acquiring of the information on the subject to be re-questioned may include acquiring an attention score indicating a degree of the conflict between each first response based on a weight value of the first neural network model, acquiring a vector corresponding to each of the plurality of external devices by inputting the predetermined token and the information on the first response into the first neural network model, acquiring conflict information on the conflict between the first response based on the attention score and the vector, and acquiring the information on the subject to be asked by inputting the conflict information into a second neural network model.

The acquiring of the attention score may include acquiring a weight value for calculating data included in a last layer of the first neural network model as the attention score.

The second neural network model may be a graph neural network model learned to minimize a conversation cost between the plurality of external devices and users of each of the plurality of external devices.

The method may further include identifying whether a conflict between the second responses occurs by inputting the predetermined token and the information on the second response into the first neural network model, wherein the acquiring the final response includes, based on the conflict between the second responses being not occurred, acquiring the final response based on the information on the first response and the information on the second response.

The acquiring of the user command and transmitting the user command to the plurality of external devices may include dividing the user command into a plurality of commands, identifying the plurality of external devices corresponding to each of the plurality of divided commands, and transmitting the divided plurality of commands to the identified plurality of external devices.

The identifying the plurality of external devices may include identifying keywords included in the divided plurality of commands, and identifying the plurality of external devices corresponding to the identified keywords based on a lookup table in which the keywords are matched with external devices previously stored in the electronic apparatus.

In accordance with another aspect of the disclosure, an electronic apparatus is provided. The electronic apparatus includes a communication interface, a memory storing at least one instruction, and a processor, wherein the processor is configured to acquire a user command from the user and control the communication interface to transmit the user command to a plurality of external devices, receive, from each external device of the plurality of external devices, information on a first question generated by the external device based on the user command and information on first response acquired by the external device in response to the generated first question, analyze each received information on the first response, identify, based on the analysis, whether there a conflict between each first response occurs, based on identification that the conflict occurs, acquire information on a subject to be re-questioned based on the received information on the generated first question and the received information on the first response, control the communication interface to transmit information on the conflict to at least one external device of the plurality of external devices, the at least one external device identified based on the information on the subject to be re-questioned, receive, from the identified at least one external device, information on a second response acquired by the identified at least one external device in response to a second question generated based on the information on the conflict, determine a final response based on the information on the first response and the information on the second response, and output the final response.

The processor may input a predetermined token and the information on the first response into a first neural network model and acquiring an embedding vector corresponding to the predetermined token, and based on the embedding vector is a predetermined value, identify the conflict between each first response occurs.

The first neural network model may learn to identify whether a plurality of input text conflict with each other.

The processor may acquire an attention score indicating a degree of the conflict between each first response based on a weight value of the first neural network model, acquire a vector corresponding to each of the plurality of external devices by inputting the predetermined token and the information on the first response into the first neural network model, acquire conflict information on the conflict between each first response based on the attention score and the vector, and acquire the information on the subject to be asked by inputting the conflict information into a second neural network model.

The processor may acquire a weight value for calculating data included in a last layer of the first neural network model as the attention score.

The processor may include identifying whether a conflict between the second responses occurs by inputting the predetermined token and the information on the second response into the first neural network model, based on the conflict between the second responses being not occurred, acquiring the final response based on the information on the first response and the information on the second response.

The processor may divide the user command into a plurality of commands, identify the plurality of external devices corresponding to each of the plurality of divided commands, and transmit the divided plurality of commands to the identified plurality of external devices.

The processor may identify keywords included in the divided plurality of commands, and identify the plurality of external devices corresponding to the identified keywords based on a lookup table in which the keywords are matched with external devices previously stored in the electronic apparatus.

The solutions of the problems of the disclosure are not limited to the solutions described above, and solutions not described will be clearly understood by those skilled in the art to which the disclosure belongs from the disclosure and the accompanying drawings.

Effect of the Invention

According to various embodiments of the disclosure as described above, the electronic apparatus may interact with a plurality of agents to identify whether each agent conflicts with each other, and may output a response based on the identified result. Accordingly, user convenience and satisfaction may be improved.

In addition, effects acquirable or predicted by the embodiments of the disclosure are to be disclosed directly or implicitly in the detailed description of the embodiments of the disclosure. For example, various effects predicted according to embodiments of the disclosure will be disclosed in the detailed description to be described below.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 4B is a view illustrating a slave node identification method according to an embodiment of the disclosure;

Throughout the drawings, like reference numerals will be understood to refer to like parts, components, and structures.

DETAILED DESCRIPTION

The terms used in example embodiments will be briefly explained, and example embodiments will be described in greater detail.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is identified that the specific description regarding a known technology obscures the gist of the disclosure, the specific description is omitted. The terms such as "first," "second," and so on may be used to describe a variety of elements, but the elements should not be limited by these terms. The terms used herein are solely intended to explain specific example embodiments, and not to limit the scope of the disclosure.

Singular forms are intended to include plural forms unless the context clearly indicates otherwise. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

The example embodiments of the disclosure will be described in greater detail below in a manner that will be understood by one of ordinary skill in the art. However, various embodiments may be realized in a variety of different configurations, and not limited to descriptions provided herein. Also, well-known functions or constructions are not described in detail since they would obscure the disclosure with unnecessary detail.

Figure 1:
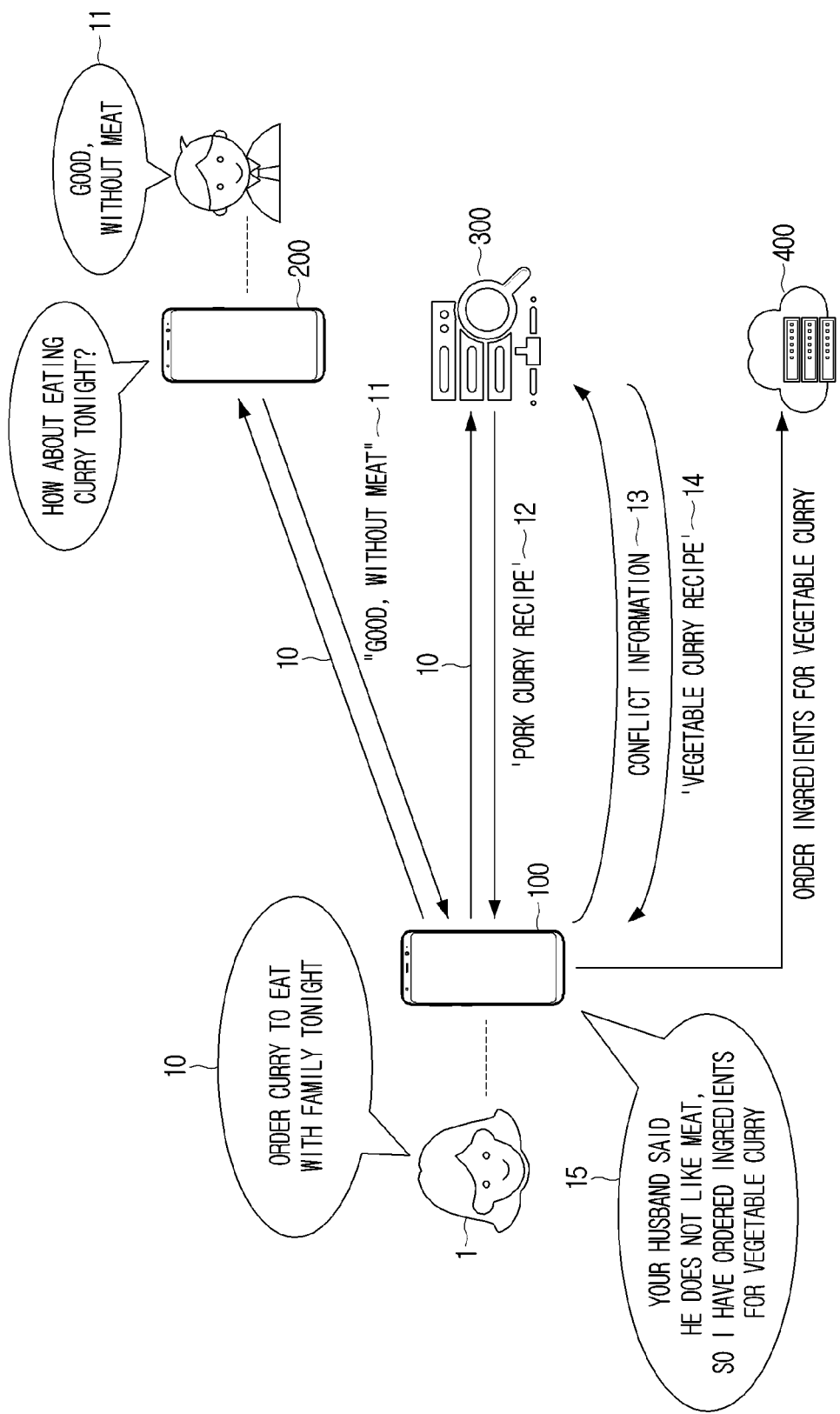
FIG. 1 is a view illustrating a concept of a conversation system according to an embodiment of the disclosure.

FIG. 1 is a view a concept of a conversation system according to an embodiment of the disclosure.

Referring to FIG. 1, a conversation system 1000 may include an electronic apparatus 100, an external device 200, a search server 300, and an order server 400.

The electronic apparatus 100 may acquire a user command 10 (e.g., "Order curry to eat with family tonight") from a user 1. The electronic apparatus 100 may interact with the external device 200 and the search server 300 to perform an operation corresponding to the user command 10. For example, the electronic apparatus 100 may transmit information related to the user command 10 to the external device 200 and the search server 300. In addition, the electronic apparatus 100 may receive first information 11 and second information 12 from the external device 200 and the search server 300, respectively.

The electronic apparatus 100 may identify whether a conflict occurs between the first information 11 and the second information 12. The occurrence of a conflict means that the acquired information conflicts with each other. If it is identified that the first information 11 and the second information 12 conflict with each other, the electronic apparatus 100 may identify a target to perform an additional operation from among the external device 200 and the search server 300, and transmit information on the conflict (or conflict information) the identified target. For example, the electronic apparatus 100 may transmit the conflict information 13 to the search server 300. In this operation, the search server 300 may acquire third information 14 based on the conflict information 13, and the electronic apparatus 100 may receive the third information 14 from the search server 300.

The electronic apparatus 100 may identify whether the first information 11 and newly acquired third information 14 conflict with each other. If it is identified that the first information 11 and the third information 14 do not conflict, the electronic apparatus 100 may perform an operation of ordering ingredients for vegetable curry from the order server 400 based on the third information 14. Then, the electronic apparatus 100 may generate and output a response 15 based on the result of performing the operation.

As such, when the electronic apparatus 100 interacts with an external device or an external server to perform an operation corresponding to the user command 10, a conflict may occur between information received from the external device or the external server. In this case, the electronic apparatus 100 may detect a conflict between received information, and may perform an operation corresponding to the user command 10 and output the response 15 by receiving new information from the external device or the external server. Accordingly, the user 1 satisfaction or convenience may be improved.

Figure 2:
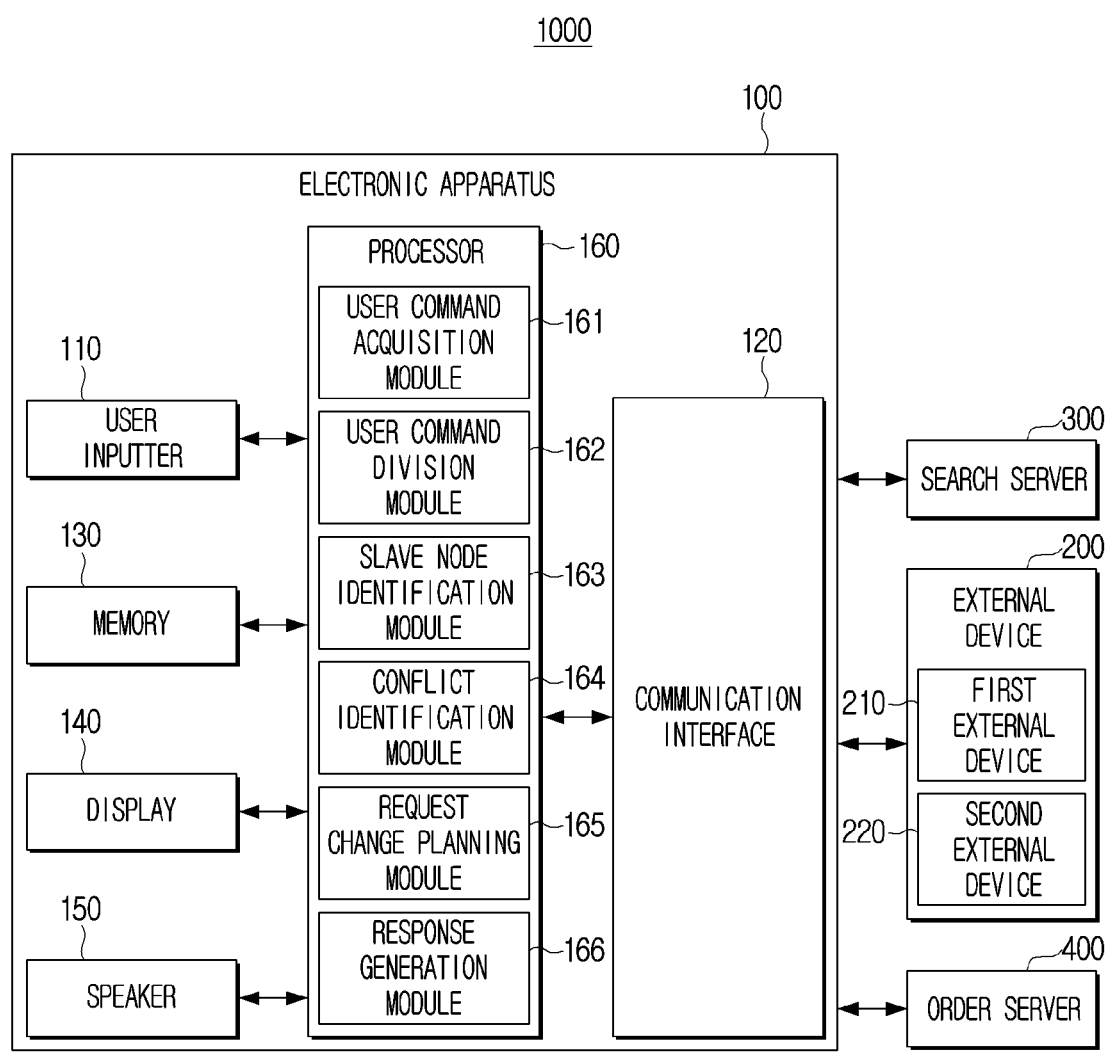
FIG. 2 is a block diagram illustrating a configuration of a conversation system according to an embodiment of the disclosure.

FIG. 2 is a block diagram illustrating a configuration of a conversation system according to an embodiment of the disclosure.

Referring to FIG. 2, the conversation system 1000 may include the electronic apparatus 100, the external device 200, the search server 300, and the order server 400. For example, the electronic apparatus 100 may be at least one of a smartphone, a tablet personal computer (PC), a smart watch, and a smart speaker. The external device 200 may be implemented as a smartphone, a tablet PC, a smart watch, a smart speaker, an IoT device, or the like. The electronic apparatus 100 may include a user inputter 110, a communication interface 120, a memory 130, a display 140, a speaker 150, and a processor 160. Hereinafter, each configuration of the electronic apparatus 100 will be described.

The user inputter 110 is configured to acquire a user command. For example, the user inputter 110 may be implemented as at least one of a touch screen for acquiring a user's touch input, a microphone for acquiring a user's voice command, and a camera for acquiring a user's gesture, but is not limited thereto.

The communication interface 120 includes at least one circuit and is a device which performs communication with various types of external devices or external servers. For example, the communication interface 120 may transmit a user command input through the user inputter 110 to the external device 200. Also, the communication interface 200 may receive information on a question generated based on a user command from the external device 200 and information on a response to a question acquired from the user of the external device 200.

The communication interface 120 may perform communication with external devices according to various types of communication methods. For example, the communication interface 120 may perform data communication wirelessly or by wire. When communicating with the external device 200 in a wireless communication method, the communication interface 120 may include at least one of a Wi-Fi communication module, a cellular communication module, a 3rd generation (3G) mobile communication module, a 4th generation (4G) mobile communication module, a 4th generation long term evolution (LTE) communication module and a 5th generation (5G) mobile communication module.

The memory 130 may store an operating system (OS) for controlling overall operations of elements of the electronic apparatus 100 and commands or data related to the elements of the electronic apparatus 100. Meanwhile, the memory 130 may be implemented as a non-volatile memory (e.g., a hard disk, a solid state drive (SSD), a flash memory), a volatile memory, or the like.

The display 140 may display a display. For example, the display 140 may display text corresponding to a user command acquired through the user inputter 110. Alternatively, the display 140 may display text corresponding to a response generated by the processor 160. Meanwhile, the display 140 may be implemented as a liquid crystal display panel (LCD), an organic light emitting diodes (OLED), and or the like, but not limited thereto.

A speaker 160 is configured to output a voice feedback of the electronic apparatus 100. For example, the speaker 160 may output a response corresponding to a user command.

The processor 160 may control the overall operation of the electronic apparatus 100. The processor 160 may include a user command acquisition module 161, a user command division module 162, a slave node identification module 163, a conflict identification module 164, a request change planning module 165, and a response generation module 166. The external device 200 may include a first external device 210 and a second external device 220. Hereinafter, the electronic apparatus 100 may be referred to as a master node, and each of the external device 200, the search server 300, and the order server 400 may be referred to as a slave node.

The user command acquisition module 161 may acquire a user command through the user inputter 110. Particularly, the user command acquisition module 161 may acquire a text corresponding to the user command. Meanwhile, the user command acquisition module 161 may acquire text corresponding to the user command in various ways. For example, when the user inputter 110 is a microphone, the user command acquisition module 161 may acquire the user's voice command through the user inputter 110. In this case, the user command acquisition module 161 may convert the user's voice command into text using a natural language processing module.

As another example, when the user inputter 110 is a touch screen, the user command acquisition module 161 may acquire a text corresponding to the user's touch. In this case, a UI element (e.g., a text box) for guiding the user's text input may be provided, and the user command acquisition module 161 may acquire an input test corresponding to the user's text input. Also, the user command acquisition module 161 may acquire the acquired input text as a user command and transmit it to the user command division module 162. Meanwhile, when the user's handwriting input is acquired, the user command acquisition module 161 may acquire text corresponding to the user's handwriting by using an optical character recognition (OCR) module.

As another example, when the user inputter 110 is a camera, the user command acquisition module 161 may acquire the user's gesture input (e.g., sign language). The user command acquisition module 161 may acquire an image of the user through the user inputter 110. In addition, the user command acquisition module 161 may analyze the acquired image to acquire text corresponding to the user's gesture input. For example, the user command acquisition module 161 may acquire text corresponding to the user's gesture input by using a neural network model (e.g., Neural Sign Language Translation (NSLT)) learned to acquire text corresponding to the input image based on the input image.

The user command division module 162 may acquire a plurality of divided commands by dividing the user command acquired through the user command acquisition module 161.

Figure 3:
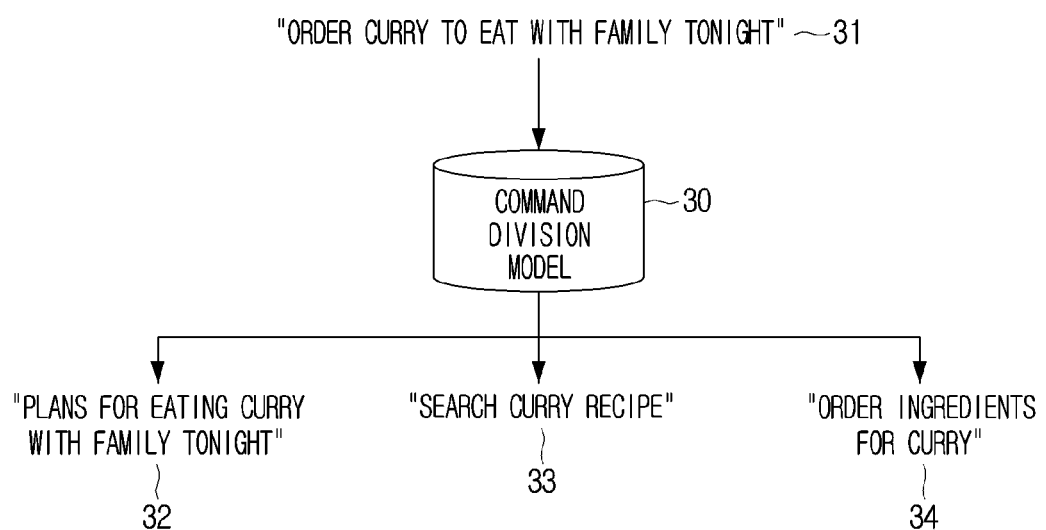
FIG. 3 is a view illustrating a method of dividing a user command according to an embodiment of the disclosure.

FIG. 3 is a view illustrating a method of dividing a user command according to an embodiment of the disclosure.

For example, referring to FIG. 3, the user command division module 162 may acquire a plurality of divided commands 32, 33, and 34 by inputting the user command 31 into a command division model 30. The command division model 30 may be a neural network model learned to receive a single question (or sentence) and output a plurality of divided questions. The command division model 30 may be learned in an end-to-end method.

The slave node identification module 163 may identify a slave node corresponding to each divided command, and transmit or deliver each command to the identified slave node. The slave node means a device for performing a task related to each divided command. The slave node may be at least one of the external device 200, the search server 300, and the order server 400.

Meanwhile, the slave node identification module 163 may identify a slave node corresponding to each command divided in various methods. As an example, the slave node identification module 163 may identify a slave node using a neural network model.

Figure 4A:
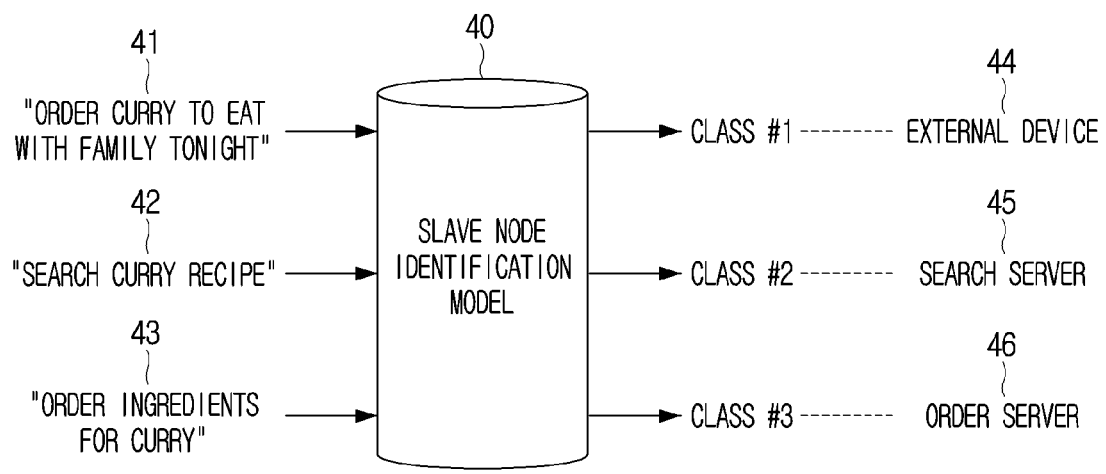
FIG. 4A is a view illustrating a slave node identification method according to an embodiment of the disclosure.

FIG. 4A is a view illustrating a slave node identification method according to an embodiment of the disclosure.

Referring to FIG. 4A, the slave node identification module 163 may acquire classes (class #1, class #2, class #3) corresponding to each of divided commands 41, 42 and 43 by inputting text corresponding to the divided commands 41, 42, 43 to the slave node identification model 40. The slave node identification module 163 may identify slave nodes 44, 45, and 46 corresponding to each class based on the acquired classes. The slave node identification model 40 may be a neural network model learned to output an identification value indicating a class of the corresponding text based on the input text.

As another example, the slave node identification module 163 may identify a keyword included in the divided command and identify a slave node corresponding to each of the divided commands by analyzing the identified keyword.

FIG. 4B is a view illustrating a slave node identification method according to an embodiment of the disclosure.

Referring to FIG. 4B, there may be a lookup table 47 in which each slave node and a keyword are matched with each other in the memory 130. In this case, the slave node identification module 163 may identify the slave node corresponding to each of the divided commands based on the lookup table 47.

The slave node identification module 163 may control the communication interface 120 to transmit the divided command to the identified slave node. For example, the slave node identification module 163 may transmit a first command ("Tonight's plans for eating curry with family") to the external device 200. The slave node identification module 163 may transmit a second command ("search for curry recipe") to the search server 300. The slave node identification module 163 may transmit a third command ("order ingredients for curry") to the order server 400.

The slave node may perform an operation corresponding to the divided command based on the divided command acquired from the master node.

Figure 5A:
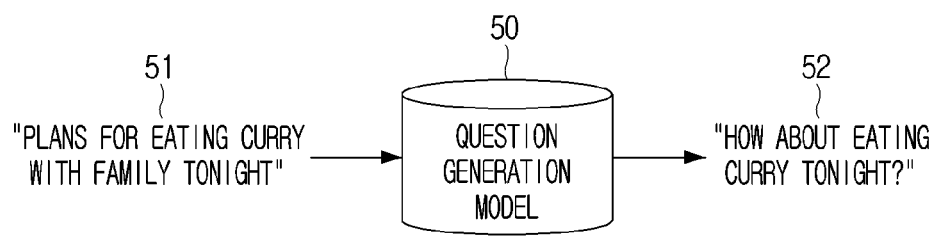
FIG. 5A is a view illustrating an operation of a slave node according to an embodiment of the disclosure.

FIG. 5A is a view illustrating an operation of a slave node according to an embodiment of the disclosure.

Referring to FIG. 5A, the external device 200 may acquire a first question 52 by inputting a first command 51 into a question generation model 50. The question generation model 50 may be a neural network model learned to generate a question based on input text. The external device 200 may output the first question 52 and acquire a response of the user of the external device 200 to the first question 52.

Figure 5B:
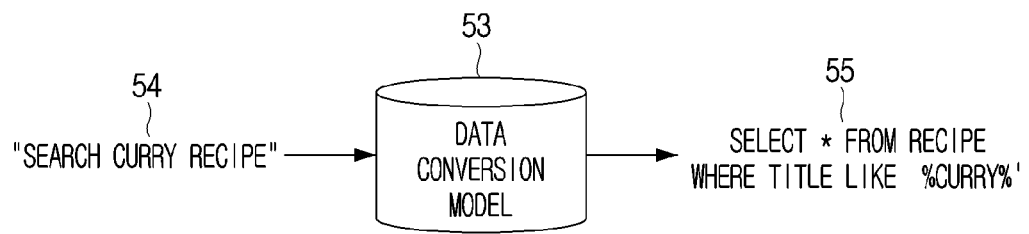
FIG. 5B is a view illustrating an operation of a slave node according to an embodiment of the disclosure.

FIG. 5B is a view illustrating an operation of a slave node according to an embodiment of the disclosure.

Referring to FIG. 5B, the search server 300 may acquire structured query language (SQL) data 55 by inputting text corresponding to a second command 54 into a data conversion model 53. In addition, the search server 300 may acquire information (e.g., information on a curry recipe) corresponding to the second command 54 based on the SQL data 55.

The conflict identification module 164 may receive information acquired from each slave node through the communication interface 120. For example, the conflict identification module 164 may receive information on each user's response from the external device 200. Also, the conflict identification module 164 may receive a search result (e.g., recipe information) acquired by the search server 300.

The conflict identification module 164 may identify whether information received from each slave node conflicts with each other using a conflict identification model (e.g., transformer). The conflict identification model may be a neural network model learned to identify whether input information conflicts with each other. For example, the conflict identification module 164 may acquire a vector corresponding to a predetermined token by inputting the predetermined token (e.g., class token) and received information to the conflict identification model. In this case, when the acquired vector is a predetermined value, the conflict identification module 164 may identify that a conflict between the received information occurs. Meanwhile, a more detailed description of the conflict identification process will be described below with reference to FIGS. 6A and 6B.

Meanwhile, the conflict identification module 164 may acquire an attention score by identifying a parameter value corresponding to at least one layer of the conflict identification model, and store the acquired attention score in the memory 130. The attention score is a weight value of an intermediate layer of the conflict identification model (transformer), and means a value indicating a relevance (or similarity) between input data to the conflict identification model. The conflict identification module 164 may identify a degree of conflict between information based on the attention score.

Meanwhile, if it is identified that a conflict between pieces of information occurs, the request change planning module 165 may identify a slave node (or a request change node) to perform an additional operation among a plurality of slave nodes. When the identified slave node is a plural, the request change planning module 165 may identify an operation execution order (or request change order) of each of the plurality of identified slave nodes. An additional operation of the slave node means an operation corresponding to a task of each slave node. For example, the additional operation of the search server 300 may refer to an operation of acquiring information on curry (e.g., recipe for "vegetable curry") based on a first command ("search for curry recipe") and previously acquired information (e.g., recipe for "pork curry").

The request change planning module 165 may acquire conflict information based on the information received from the external device 200 and the search server 300, and the attention score. The conflict information may include a graph indicating a degree of conflict between pieces of information. The request change planning module 165 may acquire request change information by inputting conflict information into the request change planning model. The request change planning model is a neural network model learned to output request change information based on conflict information. For example, the request change planning model may be a graph neural network (GNN) model. Meanwhile, the request change information may include information on a request change node and a request change order.

When the request change information corresponds to the search server 300, the request change planning module 165 may control the communication interface 120 to transmit the information on the conflict and the information acquired from the external device 200 to the search server 300. The search server 300 may acquire new information (e.g., recipe information on "vegetable curry") based on the information on the conflict. Meanwhile, the information on the conflict may include the acquired information from a fact that a conflict occurs and a conflict target (e.g., external device 200).

The response generation module 166 may generate a response based on information acquired from the slave node. The response generation module 166 may generate a response when the information acquired from the slave node no longer conflicts. For example, in FIG. 1, since the user's response of the external device 200 (i.e., "Good, without meat") and the third information (i.e., "vegetable curry recipe") do not conflict, the response generation module 166 may generate and output a response (e.g., "Your husband said he does not like meat, so I have ordered ingredients for vegetable curry"). In this case, the response generation module 166 may control the display 140 to display the generated response. Alternatively, the response generation module 166 may control the speaker 150 to output a voice signal corresponding to the generated response.

Meanwhile, various types of information transmitted/received between the electronic apparatus 100 and the external device 200 or the external servers 300 and 400 may be accumulated and stored in the memory 130. For example, in FIG. 1, the user command 10, the first information 11, and the second information 12 may be stored in the memory 130. In this case, the response generation module 166 may generate a final response based on information accumulated and stored in the memory 130.

Meanwhile, there may be a case where the slave node cannot acquire a response from the user. For example, the external device 200 may not acquire the user's response to the question ("How about eating curry tonight?") generated by the external device 200 within a predetermined time period (e.g., 10 seconds). In this case, the external device 200 may transmit information on a predetermined response to the electronic apparatus 100. A content of the predetermined response may be a positive or negative response to the generated question. Meanwhile, the predetermined time and the content of the predetermined response may be set by the master node, that is, the electronic apparatus 100.

Meanwhile, referring back to FIG. 2, each of the modules 161 to 166 has been described as a configuration of the processor 160, but this is only an embodiment, and each of the modules 161 to 166 may be stored in the memory 130. In this case, the processor 160 may execute respective functions of the plurality of modules 161 to 166 by loading the plurality of modules 161 to 166 stored in the memory 130 from a non-volatile memory to a volatile memory. In addition, each module of the processor 160 may be implemented as software or a combination of software and hardware.

Meanwhile, at least some of the modules 161 to 166 illustrated in FIG. 2 may be included in the external device 200 or the external servers 300 and 400. For example, the external device 200 may include the conflict identification module 164. The external device 200 may receive a search result from the search server 300. In addition, the external device 200 may identify whether the information on the user's response acquired by the external device 200 and the search result received from the search server 300 conflict with each other using the conflict identification module 164. In this case, if it is identified that a conflict occurs, the external device 200 may transmit information on the conflict to the electronic apparatus 100.

Figure 6A:
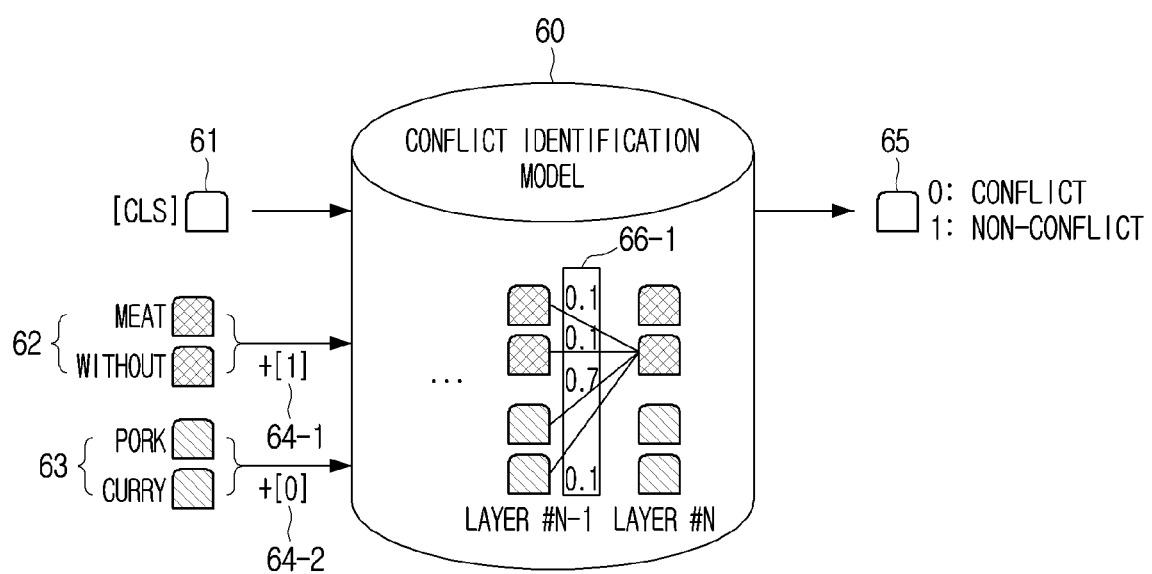
FIG. 6A is a view illustrating a conflict identification method according to an embodiment of the disclosure.

FIG. 6A is a view illustrating a conflict identification method according to an embodiment of the disclosure.

Figure 6B:
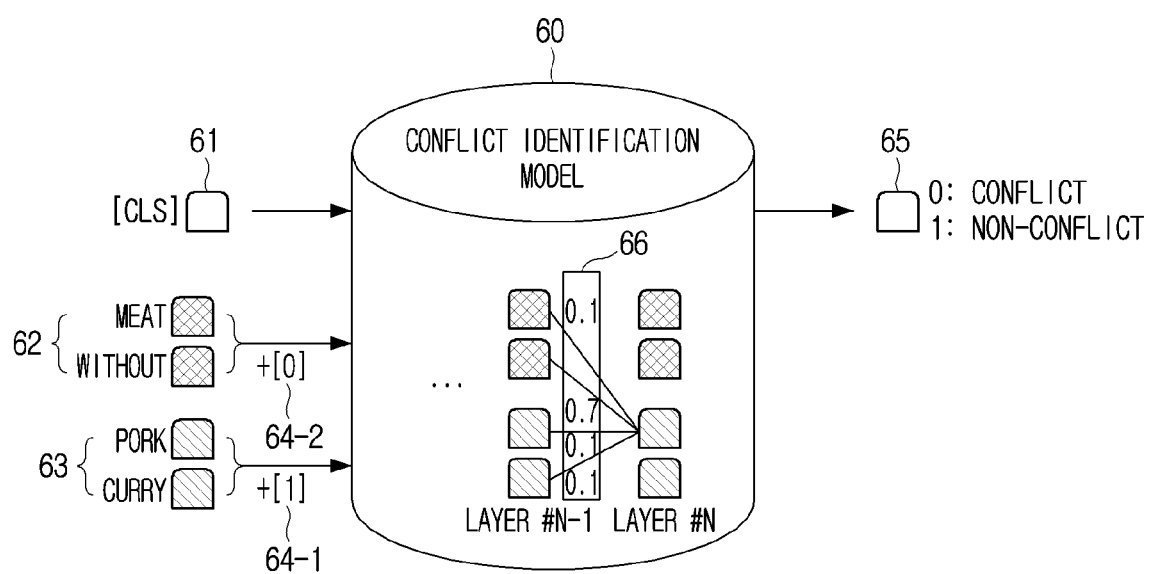
FIG. 6B is a view illustrating a conflict identification method according to an embodiment of the disclosure.

FIG. 6B is a view illustrating a conflict identification method according to an embodiment of the disclosure.

Referring to FIGS. 6A and 6B, the electronic apparatus 100 may acquire an embedding vector 65 corresponding to a predetermined token 61 by inputting the predetermined token 61, first information 62 received from the external device 200, and second information 63 received from the search server 300 to the conflict identification model 60. In this case, when the embedding vector 65 is a first predetermined value (e.g., 0), the electronic apparatus 100 may identify that the first information 62 and the second information 63 conflict with each other. Meanwhile, when the embedding vector 65 is a second predetermined value (e.g., 1), the electronic apparatus 100 may identify that the first information 62 and the second information 63 do not conflict with each other. The conflict identification model 60 may be a neural network model learned to identify a relevance between input information. Particularly, the conflict identification model 60 may be a neural network model learned to identify a relevance between a plurality of input sentences.

Meanwhile, the first information 62 may be a token corresponding to information acquired by the external device 200. In addition, the first information 62 may include information on a question generated by the external device 200 (e.g., "How about eating curry tonight?") and a response (e.g., "Good, without meat") to the question of the user of the external device 200. In addition, the second information 63 may be a token corresponding to the information acquired by the search server 300. In addition, the second information 63 may include information generated by the search server 300 (e.g., a search formula for searching for a curry recipe) and information acquired by the search server 300 (e.g., "pork curry recipe"). Although not illustrated in FIG. 6A, the electronic apparatus 100 may input not only information generated by the external device 200 and the search server 300 but also information (e.g., information on the response) acquired by the external device 200 and the search server 300 to the conflict identification model 60.

Meanwhile, the electronic apparatus 100 may assume that specific information among the information input to the conflict identification model 60 is true, and identify whether the remaining information conflicts with the specific information based on the specific information. For this operation, the electronic apparatus 100 may add a specific value to each of the specific information and the remaining information and input it into the conflict identification model 60. For example, the electronic apparatus 100 may add a first value 64-1 for identifying information assumed to be true to the first information 62, and add a second value 64-2 for identifying the remaining information to the second information 63. Specifically, the electronic apparatus 100 may allocate the first value 64-1 or the second value 64-2 to a last bit among bits corresponding to each piece of information.

Accordingly, referring to FIG. 6A, the electronic apparatus 100 may assume that the first information 62 is true and identify whether the second information 63 conflicts with the first information 62. Meanwhile, referring to FIG. 6B, the electronic apparatus 100 may assume that the second information 63 is true and identify whether the first information 62 conflicts with the second information 63.

Meanwhile, the electronic apparatus 100 may acquire an attention score indicating a degree to which each piece of information conflicts based on an intermediate result value of the conflict identification model 60. For example, the electronic apparatus 100 may acquire weight values for calculating data of a last layer (Layer #N) of the conflict identification model 60 as an attention score. Referring to FIG. 6A, the electronic apparatus 100 may acquire a first attention score 66-1 indicating a degree to which a specific token included in the first information 62 conflicts with the remaining tokens. Referring to FIG. 6B, the electronic apparatus 100 may acquire a second attention score 66-2 indicating a degree to which a specific token included in the second information 63 conflicts with the remaining tokens.

Meanwhile, referring to FIGS. 6A and 6B, a case there are two slave nodes is described as an example for convenience of description, but even when there are two or more slave nodes, conflict may be identified in the same manner as described above. For example, the external device 200 may include a first external device 210 of a first user and a second external device 220 of a second user. In this case, the electronic apparatus 100 may receive information acquired from each user from each of the first external device 210 and the second external device 220. For example, the electronic apparatus 100 may acquire a first response ("Good, without meat") to a question generated by the first external device 210 from the first external device 210. Also, the electronic apparatus 100 may acquire a second response ("Good") that is a response to the question generated by the first external device 220 from the second external device 220. In this case, the electronic apparatus 100 may identify whether there is a conflict between information by inputting the second information 63 acquired by the first response, the second response and the search server 300 to the conflict identification model 60.

Meanwhile, if it is identified that a conflict between pieces of information occurs, the electronic apparatus 100 may acquire conflict information and identify a slave node to perform an additional operation based on the conflict information. For this operation, the electronic apparatus 100 may acquire a representative embedding for each piece of information constituting the conflict information.

Figure 7A:
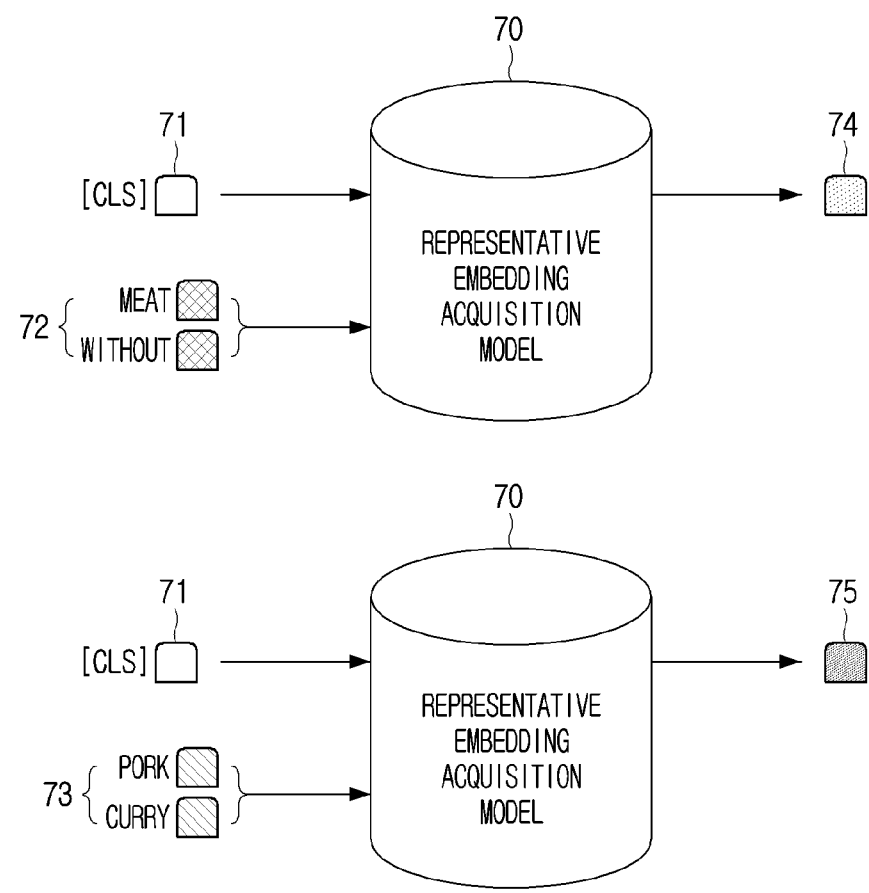
FIG. 7A is a view illustrating a method of acquiring conflict information according to an embodiment of the disclosure.

FIG. 7A is a view illustrating a method of acquiring conflict information according to an embodiment of the disclosure.

Referring to FIG. 7A, the electronic apparatus 100 may acquire a representative embedding corresponding to each slave node by inputting a predetermined token 71 and each piece of information into a representative embedding acquisition model 70. Specifically, the electronic apparatus 100 may acquire a first representative embedding 74 by inputting the predetermined token 71 and first information 72 received from the external device 200 into the representative embedding acquisition model 70. In addition, the electronic apparatus 100 may acquire a second representative embedding 75 by inputting the predetermined token 71 and second information 73 received from the search server 300 into the representative embedding acquisition model 70.

Meanwhile, although not illustrated in FIG. 7A, the electronic apparatus 100 may acquire the representative embedding by inputting the predetermined token 71 and each piece of information but also information generated by the slave node together into the representative embedding acquisition model 70. For example, the electronic apparatus 100 may be generated by the external device 200 and acquire the first representative embedding 74 by inputting information on a question corresponding to the first information 72 (e.g., "How about eating curry tonight?"), the predetermined token 71 and the first information 72 into the embedding acquisition model 70.

The electronic apparatus 100 may acquire conflict information (or conflict graph) based on an attention score and a representative embedding.

Figure 7B:
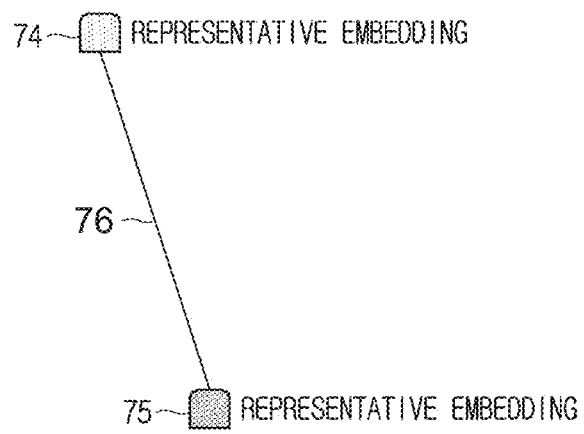
FIG. 7B is a view illustrating conflict information according to an embodiment of the disclosure.

FIG. 7B is a view illustrating conflict information according to an embodiment of the disclosure. The conflict information may be a vector calculated based on the representative embedding and attention score corresponding to each slave node.

Referring to FIG. 7B, the conflict information for the external device 200 and the search server 300 may be a vector calculated based on the first representative embedding 74, the second representative embedding 75, and an attention score 76.

As such, when the conflict information is acquired, the electronic apparatus 100 may identify a slave node to perform an additional operation based on the conflict information.

Figure 8A:
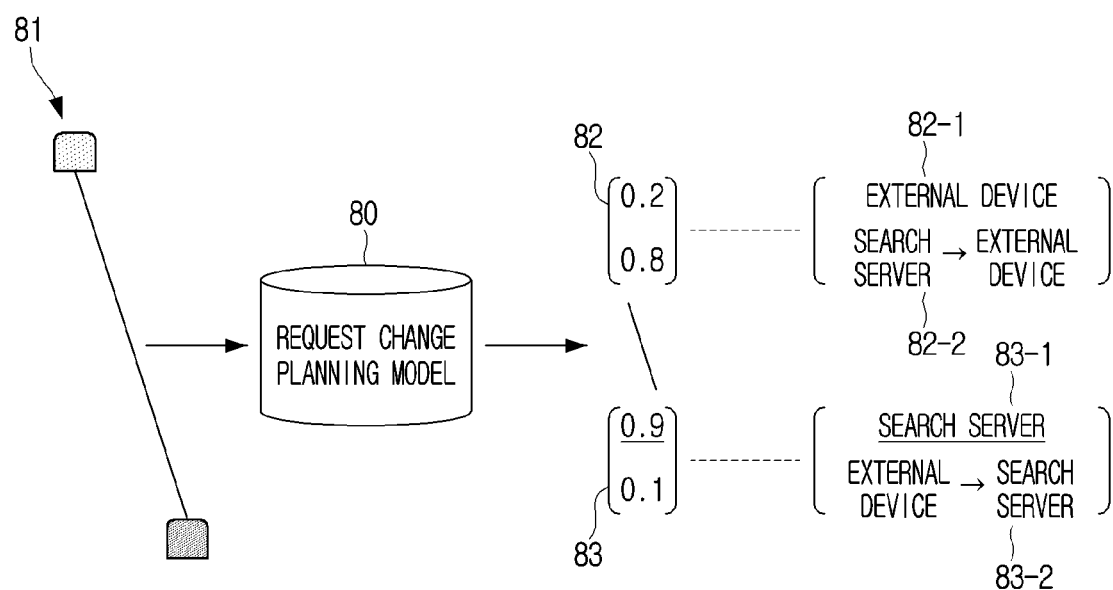
FIG. 8A is a view illustrating a request change method according to an embodiment of the disclosure.

FIG. 8A is a view illustrating a request change method according to an embodiment of the disclosure.

Referring to FIG. 8A, the electronic apparatus 100 may acquire request change information 82 and 83 corresponding to each slave node by inputting conflict information 81 into a request change planning model 80. For example, the electronic apparatus 100 may acquire first request change information 82 corresponding to the external device 200 and second request change information 83 corresponding to the search server 300. Meanwhile, each request change information may include a probability value corresponding to a request change order in which each slave node becomes a target of a last request change. For example, the first request change information 82 may include a probability value (i.e., 0.2) corresponding to a first order 82-1 in which the external device 200 is the target of the last request change and a probability value (i.e., 0.8) corresponding to a second order 82-2. The first order 82-1 refers to a case in which the external device 200 performs an additional operation. In addition, the second order 82-2 refers to a case in which the search server 300 first performs an additional operation and the external device 200 performs the additional operation. Also, a third order 83-1 refers to a case in which the search server 300 performs an additional operation. A fourth order 83-2 refers to a case in which the external device 200 first performs an additional operation and the search server 300 performs the additional operation.

Meanwhile, the probability value included in each request change information may mean a probability that a total conversation cost will be minimized when a slave node performs an additional operation according to each order. The total conversation cost may be related to the number of request changes required (or the number of operations to be additionally performed by the slave node) until a final response to the user command is acquired. For example, the larger the number of request changes, the higher the overall conversation cost may be.

The electronic apparatus 100 may identify the largest probability value (i.e., 0.9) among the probability values included in the request change information 82 and 83. Also, the electronic apparatus 100 may identify a request change order (i.e., third order 83-1) corresponding to the identified probability value. The electronic apparatus 100 may transmit information on the conflict to the slave node corresponding to the identified request change order. The information on the conflict may include a fact that a conflict occurs and information acquired from a conflict target. For example, the electronic apparatus 100 may transmit the fact that the conflict occurs and information received from the external device 200 to the search server 300 corresponding to the third order 83-1.

Meanwhile, the search server 300 may perform an additional operation. For example, referring to FIG. 8B, the search server 300 may acquire new information 86 (e.g., recipe for "vegetable curry") based on a first command 84 ("search for curry recipe") and previously acquired information 85 (e.g., "Good, without meat").

Figure 8B:
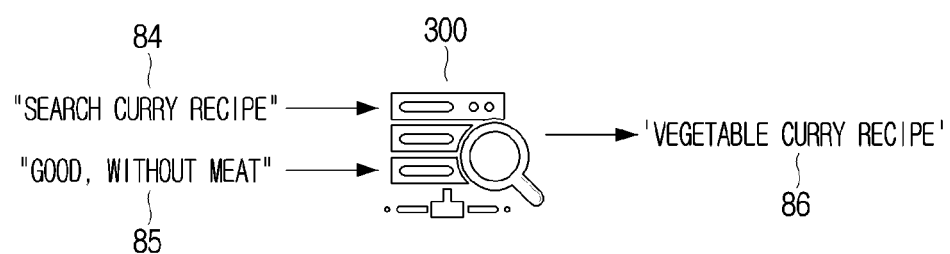
FIG. 8B is a view illustrating an additional operation of a slave node according to an embodiment of the disclosure.
Figure 8C:
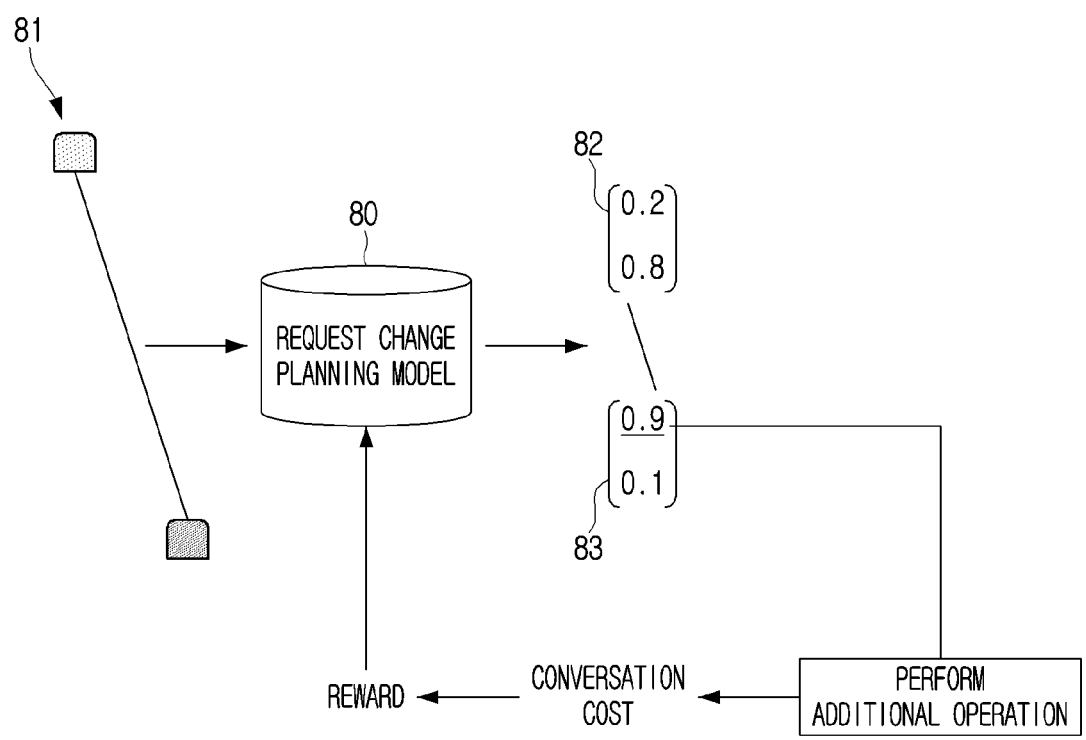
FIG. 8C is a view illustrating a method of learning a request change planning model according to an embodiment of the disclosure.

FIG. 8C is a view illustrating a learning method of the request change planning model 80 according to an embodiment of the disclosure. The request change planning model 80 may be learned based on reinforcement learning. Specifically, a slave node to perform an additional operation may be identified based on the request change information output by the request change planning model 80.

For example, referring to FIG. 8B, the search apparatus 300 may be identified as a slave node to perform an additional operation. Meanwhile, a conversation cost generated in the conversation system may be calculated according to a result of performing the additional operation of the slave node. Also, a reward may be given to the request change planning model 80 based on the conversation cost. In this case, when the conversation cost increases in a current state, a negative reward may be given to the request change planning model 80, and when the conversation cost decreases, a positive reward may be given to the request change planning model 80. The request change planning model 80 may be iteratively learned such that the reward granted is maximized. In other words, the request change planning model 80 may be learned such that the conversation cost is minimized.

Figure 9:
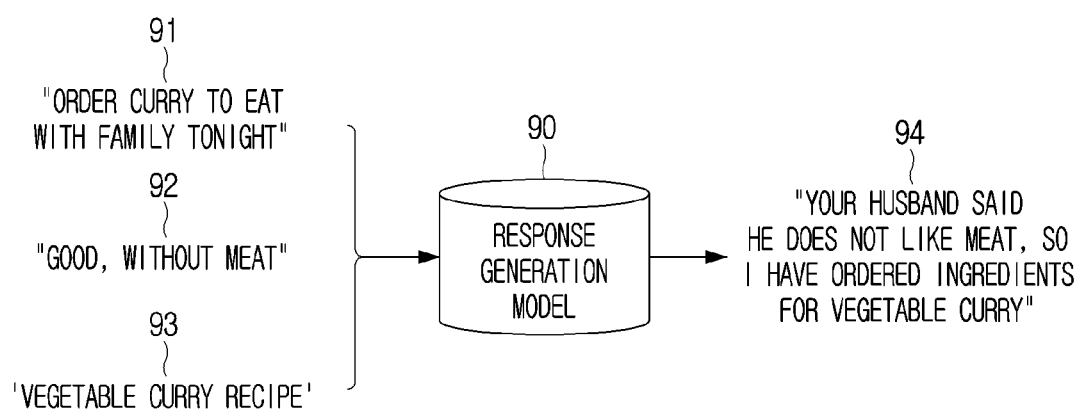
FIG. 9 is a view illustrating a method for generating a response according to an embodiment of the disclosure.

FIG. 9 is a view illustrating a method of generating a response according to an embodiment of the disclosure. As described above, if it is identified that the conflict between the received information no longer occurs, the electronic apparatus 100 may generate and output a response. In this case, the electronic apparatus 100 may acquire a response using the response generation model 90.

Referring to FIG. 9, the electronic apparatus 100 may acquire a response 94 to the user command 91 by inputting the user command 91 acquired from the user and information received from a slave node to the response generation model 90. The information received from the slave node may include information 92 acquired by the external device 200 and information 93 acquired by the search server 300.

Meanwhile, the response generation model 90 may be based on a so-called vision-language pre-training (VLP) model, and may be learned to generate a response based on input text.

Figure 10:
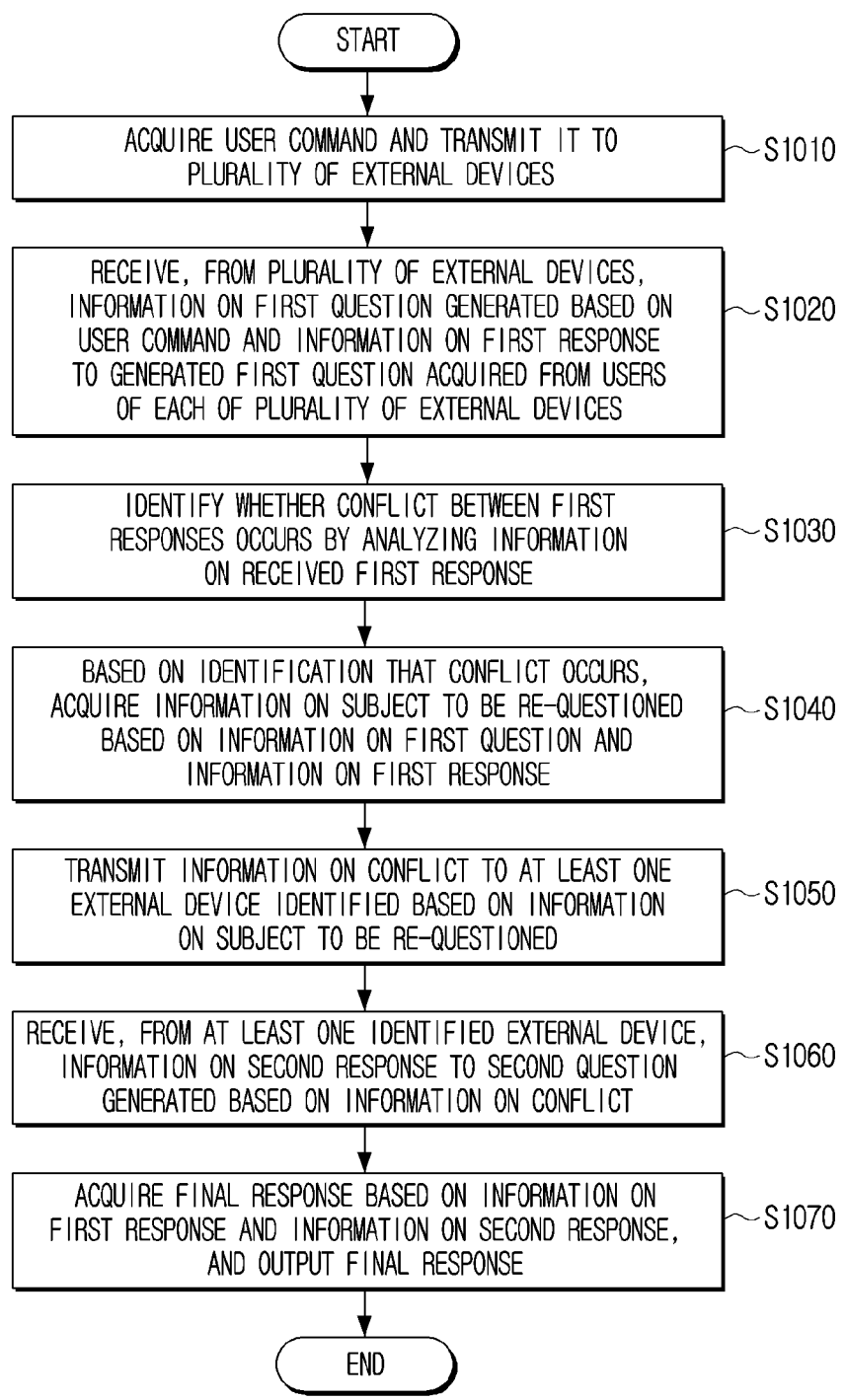
FIG. 10 is a view illustrating a method of controlling an electronic apparatus according to an embodiment of the disclosure.

FIG. 10 is a view illustrating a method of controlling an electronic apparatus according to an embodiment of the disclosure.

Referring to FIG. 10, the electronic apparatus 100 may acquire a user command and transmit it to a plurality of external devices at operation S1010. In this case, the electronic apparatus 100 may divide the user command into a plurality of commands. In addition, the electronic apparatus 100 may identify an external device corresponding to each of the plurality of divided commands, and transmit the plurality of divided commands to the identified external devices.

In addition, the electronic apparatus 100 may receive, from the plurality of external devices, information on a first question generated based on a user command and information on a first response to the generated first question acquired from users of each of a plurality of external devices at operation S1020. The electronic apparatus 100 may identify whether a conflict between the first responses occurs by analyzing information on the received first response at operation S1030. In this case, the electronic apparatus 100 may acquire an embedding vector by inputting a predetermined token, information on the first question, and information on the first response to a first neural network model. If the embedding vector is a predetermined value, the electronic apparatus 100 may identify that a conflict between the first responses occurs.

If it is identified that the conflict occurs, the electronic apparatus 100 may acquire information on a subject to be re-questioned based on the information on the first question and the information on the first response at operation S1040. In this case, the electronic apparatus 100 may acquire an attention score indicating a degree of conflict between the first responses based on a weight value of the first neural network model. Also, the electronic apparatus 100 may acquire a vector corresponding to each of the plurality of external devices by inputting a predetermined token, information on the first question, and information on the first response to the first neural network model. In addition, the electronic apparatus 100 may acquire conflict information regarding the conflict between the first responses based on the attention score and the vector. The electronic apparatus 100 may acquire information on the subject to be re-questioned by inputting the conflict information into a second neural network model.

The electronic apparatus 100 may transmit information on the conflict to at least one external device identified based on the information on the subject to be re-questioned at operation S1050. Also, the electronic apparatus 100 may receive, from at least one identified external device, and information on the second response to the second question generated based on the information on the conflict at operation S1060. Also, the electronic apparatus 100 may acquire information on the second question from at least one identified external device. The electronic apparatus 100 may identify whether a conflict between the second responses occurs by inputting a predetermined token, information on the second question, and information on the second response into the first neural network model. If there is no conflict between the second responses, the electronic apparatus 100 may acquire a final response based on the information on the first response and the information on the second response, and may output the final response at operation S1070.

Figure 11:
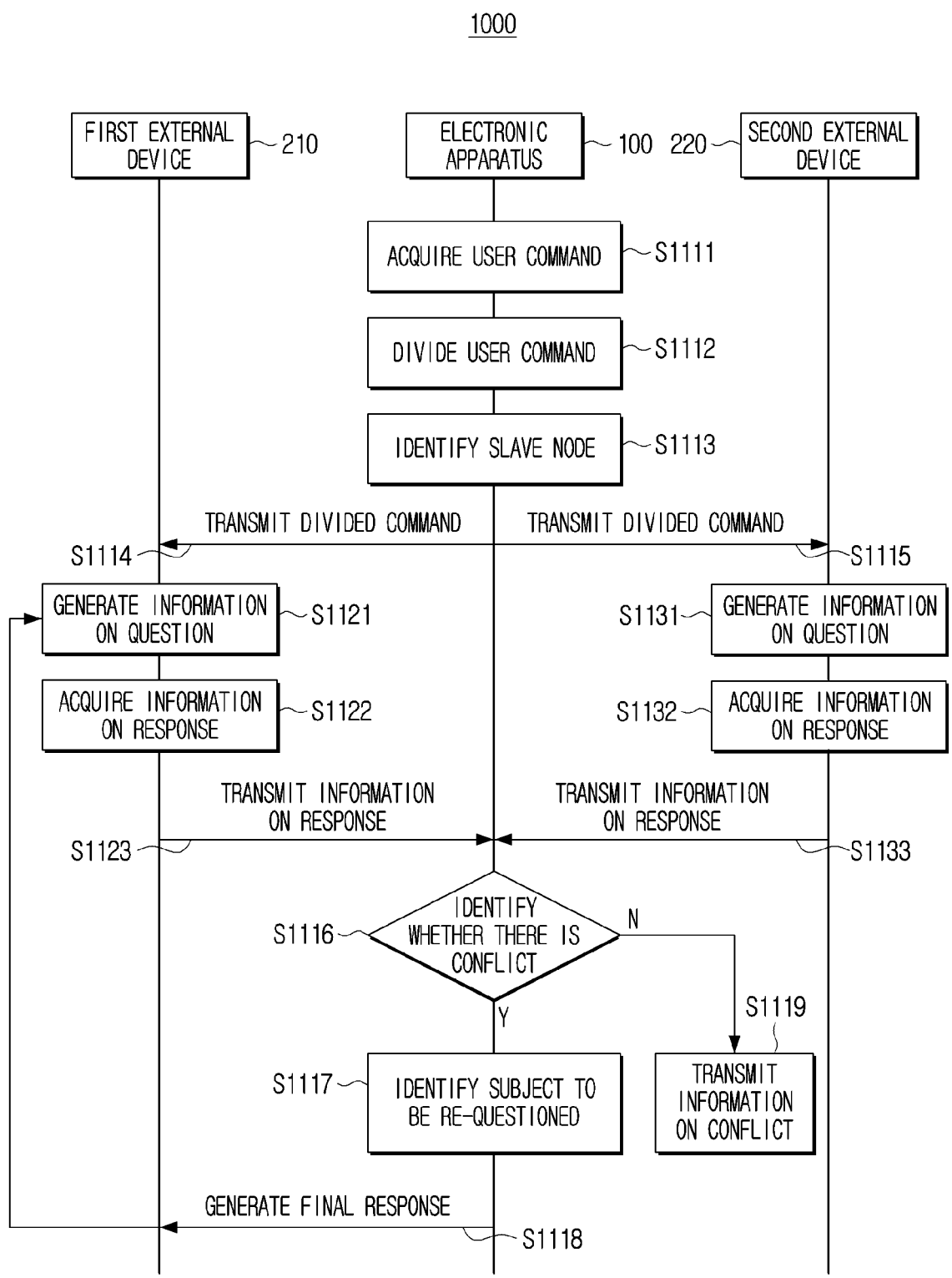
FIG. 11 is a sequence diagram illustrating an operation of a conversation system according to an embodiment of the disclosure.

FIG. 11 is a sequence diagram illustrating an operation of a conversation system according to an embodiment of the disclosure. A conversation system 1000 may include the electronic apparatus 100, the first external device 210, and the second external device 220.

Referring to FIG. 11, the electronic apparatus 100 may acquire a user command at operation S1111 and divide the user command into a plurality of commands at operation S1112. For example, the electronic apparatus 100 may acquire a 1-1 command and a 1-2 command by dividing the user command. Also, the electronic apparatus 100 may identify a slave node corresponding to each of the plurality of divided commands at operation S1113. For example, the electronic apparatus 100 may identify the first external device 210 as a slave node corresponding to the 1-1 command, and identify the second external device 220 as a slave node corresponding to the 1-2 command. Also, the electronic apparatus 100 may transmit the divided command to each slave node at operations S1114 and S1115.

The first external device 210 may generate information on a question based on the 1-1 command at operation S1121. Also, the first external device 210 may output the generated question and acquire information on a response from the user of the first external device 210 at operation S1122. For example, the first external device 210 may acquire a 1-1 question by inputting the 1-1 command to a learned question generation model. In addition, the first external device 210 may acquire information on a 1-1 response to the 1-1 question from the user of the first external device 210.

Similarly, the second external device 220 may generate information on a question based on a 1-2 command at operation S1131. Also, the second external device 220 may output the generated question and acquire information on a response from the user of the second external device 220 at operation S1132. For example, the second external device 220 may acquire a 1-2 question by inputting the 1-2 commands to a learned question generation model. In addition, the second external device 220 may acquire information on a 1-2 response to the 1-2 question from the user of the second external device 220.

In addition, the first external device 210 may transmit information on the response to the electronic apparatus 100 at operation S1123. For example, the first external device 210 may transmit information on the 1-1 response. Also, the second external device 220 may transmit information on the response to the electronic apparatus 100 at operation S1133.

For example, the second external device 220 may transmit information on the 1-2 response.

The electronic apparatus 100 may identify whether there is a conflict between information on the received response at operation S1116. For example, the electronic apparatus 100 may acquire an embedding vector by inputting a predetermined token, information on the 1-1 response, and information on the 1-2 response into the first neural network model. If the embedding vector is a predetermined value (e.g., 1), the electronic apparatus 100 may identify that a conflict between information on the received response occurs.

When it is identified that a conflict occurs, the electronic apparatus 100 may identify a subject to be re-questioned from the first external device 210 and the second external device 220 at operation S1117. Specifically, the electronic apparatus 100 may acquire information on the subject to be re-questioned by inputting conflict information calculated based on an attention score and a representative embedding into the second neural network model. This has been described above with reference to FIG. 8A, and a detailed description thereof will be omitted.

The electronic apparatus 100 may transmit information on the conflict to the subject to be re-questioned. For example, the electronic apparatus 100 may transmit information on the conflict to the first external device 210 at operation S1118. In addition, operations S1121, S1122, and S1116 may be sequentially performed. Meanwhile, if it is identified that a conflict has not occurred in operation of S1116, the electronic apparatus 100 may generate a final response based on information on the received response at operation S1119, and may output the final response.

Meanwhile, functions related to artificial intelligence according to the disclosure are operated through the processor 160 and the memory 130. The processor 160 may include one or a plurality of processors. In this case, the one or more processors may be a general-purpose processor such as a central processing unit (CPU), an application processor (AP), a digital signal processor (DSP), or the like, a graphics-only processor such as a graphics processing unit (GPU), a vision processing unit (VPU), or an artificial intelligence-only processor such as a numeric processing unit (NPU). One or more processors control to process input data according to a predefined operation rule or artificial intelligence model stored in the memory 130. Alternatively, when one or more processors are artificial intelligence (AI)-only processors, the AI-only processor may be designed with a hardware structure specialized for processing a specific AI model.

The predefined operation rule or artificial intelligence model is characterized in that it is generated through learning. Here, being generated through learning means that a basic artificial intelligence model is learned using a plurality of learning data by a learning algorithm, such that the predefined operation rule or artificial intelligence model set to perform a desired characteristic (or purpose) is generated. Such learning may be performed in a device itself on which artificial intelligence according to the disclosure is performed, or may be performed through a separate server and/or system. There are examples of the learning algorithm such as supervised learning, unsupervised learning, semi-supervised learning, or reinforcement learning, but are not limited thereto.

The AI model may be generated through learning. Here, being made through learning means that a basic artificial intelligence model is learned using a plurality of learning data by a learning algorithm, such that a predefined operation rule or artificial intelligence model set to perform a desired characteristic (or purpose) is generated. The artificial intelligence model may be composed of a plurality of neural network layers. Each of the plurality of neural network layers has a plurality of weight values, and perform a neural network operation through an operation between an operation result of a previous layer and a plurality of weight values. The plurality of weight values of the plurality of neural network layers may be optimized by a learning result of the artificial intelligence model. For example, a plurality of weight values may be updated such that a loss value or a cost value acquired from the artificial intelligence model during the learning process is reduced or minimized.

The AI model may be processed by an AI-only processor designed with a hardware structure specialized for processing the AI model. The AI model may be generated through learning. Here, being generated through learning means that a basic artificial intelligence model is learned using a plurality of learning data by a learning algorithm, such that a predefined operation rule or artificial intelligence model set to perform a desired characteristic (or purpose) is generated. The artificial intelligence model may be composed of a plurality of neural network layers. Each of the plurality of neural network layers has a plurality of weight values, and perform a neural network operation through an operation between an operation result of a previous layer and a plurality of weight values.

The artificial neural network may include a deep neural network (DNN), for example, a convolutional neural network (CNN), a deep neural network (DNN), a recurrent neural network (RNN), a generative adversarial network (GAN), restricted Boltzmann machine (RBM), deep belief network (DBN), bidirectional recurrent deep neural network (BRDNN), or deep Q-networks, but is not limited to the examples described above.

Various embodiments described above may be embodied in a recording medium that may be read by a computer or a similar apparatus to the computer by using software, hardware, or a combination thereof. In some cases, the embodiments described herein may be implemented by the processor itself. In a software configuration, various embodiments described in the specification such as a procedure and a function may be embodied as separate software modules. The software modules may respectively perform one or more functions and operations described in the disclosure.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device.

The non-transitory computer readable recording medium refers to a medium that stores data and that can be read by devices. For example, the non-transitory computer-readable medium may be compact disc (CD), digital versatile disc (DVD), a hard disc, Blu-ray disc, universal serial bus (USB), a memory card, read only memory (ROM), or the like.

The foregoing exemplary embodiments and advantages are merely exemplary and are not to be construed as limiting the disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of controlling an electronic apparatus comprising:
acquiring a user command from a user and transmitting the user command to a plurality of external devices;
receiving, from each external device of the plurality of external devices, information on a first question generated by the external device based on the user command and information on a first response acquired by the external device in response to the generated first question;
analyzing each of the received information on the first response;
identifying, based on the analyzing, whether a conflict between each of the first response occurs;
based on the identifying that the conflict occurs, acquiring information on a subject to be re-questioned based on the received information on the generated first question and the received information on the first response;
identifying at least one external device of the plurality of external devices, based on the information on the subject to be re-questioned;
transmitting information on the conflict to the identified at least one external device;
receiving, from the identified at least one external device, information on a second response acquired by the identified at least one external device in response to a second question generated based on the information on the conflict;
determining a final response based on the information on the first response and the information on the second response; and
outputting the final response,
wherein the conflict is that information acquired from each of the plurality of external devices conflicts with each other,
wherein the information includes a graph indicating a degree of conflict between pieces of information,
wherein the information on the generated first question and the information on the first response includes specific information and remaining information,
wherein a specific value is added to each of the specific information and the remaining information,
wherein the identifying of whether the conflict between each of the first response occurs comprises:
inputting a predetermined token and the information on the first response into a first neural network model and acquiring an embedding vector corresponding to the predetermined token, and
based on the embedding vector being a predetermined value, identifying that the conflict between each of the first response occurs, and
wherein the acquiring of the information on the subject to be re-questioned comprises:
acquiring an attention score indicating a degree of the conflict between each of the first response based on a weight value of the first neural network mode,
acquiring a vector corresponding to each of the plurality of external devices by inputting the predetermined token and the information on the first response into the first neural network model,
acquiring conflict information on the conflict between the first response based on the attention score and the vector, and
acquiring the information on the subject to be asked by inputting the conflict information into a second neural network model.

2. The method of claim 1, wherein the first neural network model adapts to learn to identify whether a plurality of input text conflict with each other.

3. The method of claim 1, wherein the acquiring of the attention score comprises acquiring a weight value for calculating data included in a last layer of the first neural network model as the attention score.

4. The method of claim 1, wherein the second neural network model is configured to be a graph neural network model learned to minimize a conversation cost between the plurality of external devices and users of each of the plurality of external devices.

5. The method of claim 1, further comprising:
identifying whether a conflict between the second responses occurs by inputting the predetermined token and the information on the second response into the first neural network model,
wherein the acquiring of the final response comprises, based on the conflict between the second responses being not occurred, acquiring the final response based on the information on the first response and the information on the second response.

6. The method of claim 1, wherein the acquiring of the user command and transmitting the user command to the plurality of external devices comprises:
dividing the user command into a plurality of commands;
identifying the plurality of external devices corresponding to each of the plurality of divided commands; and
transmitting the divided plurality of commands to the identified plurality of external devices.

7. The method of claim 6, wherein the identifying of the plurality of external devices comprises:
identifying keywords included in the divided plurality of commands; and
identifying the plurality of external devices corresponding to the identified keywords based on a lookup table in which the keywords are matched with external devices previously stored in the electronic apparatus.

8. An electronic apparatus comprising:
a communication interface;
memory storing at least one instruction; and
a processor,
wherein the processor, when executing the at least one instruction, is configured to:
acquire a user command from a user and control the communication interface to transmit the user command to a plurality of external devices,
receive, from each external device of the plurality of external devices, information on a first question generated by the external device based on the user command and information on a first response acquired by the external device in response to the generated first question,
analyze each of the received information on the first response,
identify, based on the analysis, whether there a conflict between each of the first response occurs,
based on identification that the conflict occurs, acquire information on a subject to be re-questioned based on the received information on the generated first question and the received information on the first response,
identify at least one external device of the plurality of external devices, based on the information on the subject to be re-questioned, control the communication interface to transmit information on the conflict to the identified at least one external device,
receive, from the identified at least one external device, information on a second response acquired by the identified at least one external device in response to a second question generated based on the information on the conflict,
determine a final response based on the information on the first response and the information on the second response, and
output the final response,
wherein the conflict is that information acquired from each of the plurality of external devices conflicts with each other,
wherein the information includes a graph indicating a degree of conflict between pieces of information,
wherein the information on the generated first question and the information on the first response includes specific information and remaining information,
wherein a specific value is added to each of the specific information and the remaining information,
wherein the processor, when executing the at least one instruction, is further configured to:
 input a predetermined token and the information on the first response into a first neural network model and acquiring an embedding vector corresponding to the predetermined token, and
 based on the embedding vector is a predetermined value, identify the conflict between each of the first response occurs, and
wherein the processor, when executing the at least one instruction, is further configured to:
 acquire an attention score indicating a degree of the conflict between each of the first response based on a weight value of the first neural network model,
 acquire a vector corresponding to each of the plurality of external devices by inputting the predetermined token and the information on the first response into the first neural network model,
 acquire conflict information on the conflict between each of the first response based on the attention score and the vector, and
 acquire the information on the subject to be asked by inputting the conflict information into a second neural network model.

9. The electronic apparatus of claim 8, wherein the first neural network model adapts to learn to identify whether a plurality of input text conflict with each other.

10. The electronic apparatus of claim 8, wherein the processor, when executing the at least one instruction, is further configured to acquire a weight value for calculating data included in a last layer of the first neural network model as the attention score.

11. The electronic apparatus of claim 8, wherein the second neural network model is configured to be a graph neural network model learned to minimize a conversation cost between the plurality of external devices and users of each of the plurality of external devices.

12. The electronic apparatus of claim 8, wherein the first neural network model comprises a plurality of neural network layers.

13. The electronic apparatus of claim 12,
wherein each of the plurality of neural network layers has a plurality of weight values, and
wherein the processor, when executing the at least one instruction, is further configured to perform a neural network operation through an operation between an operation result of a previous layer and the plurality of weight values.

14. The electronic apparatus of claim 8, wherein the attention score indicating the degree of the conflict between each of the first responses further indicates a degree to which each piece information of each of the first response conflicts based on an intermediate result value.

* * * * *